United States Patent
Tsirkin (10) Patent No.: US 10,860,359 B2
(45) Date of Patent: Dec. 8, 2020

(54) KEY MANAGEMENT FOR ENCRYPTED VIRTUAL MACHINES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 43 days.

(21) Appl. No.: 15/907,640

(22) Filed: Feb. 28, 2018

(65) Prior Publication Data
US 2019/0265999 A1    Aug. 29, 2019

(51) Int. Cl.
  G06F 9/455    (2018.01)
  G06F 9/48    (2006.01)
  H04L 9/08    (2006.01)
  H04L 29/06    (2006.01)
  G06F 9/445    (2018.01)
  G06F 9/4401    (2018.01)

(52) U.S. Cl.
  CPC ........ G06F 9/45558 (2013.01); G06F 9/4401 (2013.01); G06F 9/445 (2013.01); G06F 9/4856 (2013.01); H04L 9/0894 (2013.01); H04L 63/0428 (2013.01); *G06F 2009/4557* (2013.01); *G06F 2009/45575* (2013.01); *G06F 2009/45587* (2013.01)

(58) Field of Classification Search
  CPC ................................................... G06F 9/45558
  See application file for complete search history.

(56) References Cited

U.S. PATENT DOCUMENTS

| | | | |
|---|---|---|---|
| 8,856,504 B2 | 10/2014 | Maino et al. | |
| 9,471,355 B2 | 10/2016 | Coles et al. | |
| 9,514,313 B2 * | 12/2016 | Angelo | G06F 21/602 |
| 9,652,263 B2 | 5/2017 | Graf et al. | |
| 9,652,278 B2 * | 5/2017 | Dow | G06F 9/45558 |
| 2014/0215459 A1 * | 7/2014 | Tsirkin | G06F 9/45558 |
| | | | 718/1 |
| 2016/0197949 A1 * | 7/2016 | Nyhuis | H04L 63/1425 |
| | | | 713/190 |
| 2017/0026355 A1 | 1/2017 | Mathaiyan et al. | |
| 2017/0104755 A1 | 4/2017 | Arregoces et al. | |
| 2017/0277898 A1 * | 9/2017 | Powell | G06F 21/602 |
| 2018/0091551 A1 * | 3/2018 | Palanigounder | H04L 63/166 |
| 2019/0102577 A1 * | 4/2019 | Gueron | G06F 21/79 |
| 2019/0199689 A1 * | 6/2019 | McKellar | H04L 9/3297 |

\* cited by examiner

*Primary Examiner* — Charlie Sun
(74) *Attorney, Agent, or Firm* — Lowenstein Sandler LLP (57) ABSTRACT

Systems and methods for key management for encrypted virtual machines are disclosed. An example method may include receiving, by a source hypervisor running on a source host machine, a notification that a guest initialization is complete for migration of a virtual machine from the source hypervisor to a destination hypervisor, wherein the guest initialization comprises storing secret data associated with the virtual machine in an encrypted memory; initiating the migration of the virtual machine from the source host machine to the destination host machine in view of the notification; and transmitting, by the source hypervisor, an execution state of the virtual machine to the destination hypervisor, the execution state comprising at least a portion of the encrypted memory that stores the secret data. In some embodiments, the secret data comprises a cryptographic key.

18 Claims, 8 Drawing Sheets

KEY MANAGEMENT FOR ENCRYPTED VIRTUAL MACHINES

TECHNICAL FIELD

The disclosure is generally related to virtualization systems, and is more specifically related to key management for encrypted virtual machines.

BACKGROUND

Virtualization is a computing technique that improves system utilization, decoupling applications from the underlying hardware, and enhancing workload mobility and protection. Virtualization may be realized through the implementation of virtual machines (VMs). A VM is a portion of software that, when executed on appropriate hardware, creates an environment allowing the virtualization of a physical computer system (e.g., a server, a mainframe computer, etc.). The physical computer system is typically referred to as a "host machine," and the operating system of the host machine is typically referred to as the "host operating system." A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, backing up the state of virtual machines periodically in order to provide disaster recovery and restoration of virtual machines, and so on.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Described herein are methods and systems for key management for encrypted virtual machines (VMs). Encrypted virtualization provides a security paradigm that protects VMs from physical threats, as well as other VMs and a hypervisor that manages the VMs. In one implementation, encrypted VMs may be provided using a Secure Encrypted Virtualization (SEV) feature set. For example, when encrypted virtualization is enabled, an encryption engine (e.g., firmware, circuitry of a processing device, etc.) of a host machine can associate each encrypted VM hosted by the host machine with a VM-specific key that is not accessible to other VMs or the hypervisor managing the encrypted VM. The VM-specific key may be generated and maintained by the encryption engine and may only be accessible to the encryption engine. Private memory of a VM may be encrypted with the VM-specific key. Accesses to (e.g., reading from or writing to) to the private memory are controlled by the encryption engine. The encryption engine thus provides strong cryptographic isolation between VMs, as well as between the VMs and the hypervisor.

However, conventional encrypted virtualization techniques use a complicated key management mechanism for guest launch. As a hypervisor does not have access to VM-specific keys that are used to protect data of encrypted VMs, the hypervisor may lack access to data required to start an encrypted VM. Conventionally, to start an encrypted VM, a host machine may implement an attestation process to prove to a guest owner of the encrypted VM (e.g., a server of an owner of the encrypted VM) that the encrypted VM may be securely launched with encrypted virtualization features enabled. During the attestation process, the guest owner may provide a guest image to the host machine. An encryption engine of a CPU of the host machine may generate a measurement using the guest image. The measurement may represent contents of memory of the encrypted VM. The encryption engine can pass the measurement to a hypervisor managing the encrypted VM for transmission to the guest owner. Upon receiving the measurement from the hypervisor, the guest owner may determine whether the measurement is correct. If the measurement is regarded as being correct, the guest owner can provide secret data (e.g., a disk decryption key) to be used to start the encrypted VM. For example, the hypervisor can initiate a secure network connection to facilitate communication between the encrypted VM and the guest owner. The guest owner can transmit the secret data to the encrypted VM via the secure network connection. As such, the attestation process is complicated and may require a secure communication connection between the encrypted VM and the guest owner. To establish the secure communication connection, the encrypted VM and the guest owner may have to implement a complicated key-exchange scheme.

Aspects of the disclosure address the above deficiencies and other deficiencies by providing mechanisms (e.g., systems, methods, machine-readable media, etc.) for key management for encrypted VMs. The mechanisms can migrate a virtual machine from a source hypervisor running on a source host machine to a destination hypervisor running on a destination host machine.

In one implementation, the virtual machine may perform a guest initialization for the migration from the source hypervisor to the destination hypervisor. For example, the virtual machine may load secret data associated with the virtual machine to a memory of the virtual machine (also referred to as the "first memory"). In some embodiments, the secret data may be loaded from the source hypervisor. The secret data can include data to be used to boot and/or run the virtual machine. The secret data may include, for example, a cryptographic key that can be used to access encrypted contents for the boot of the virtual machine on the destination host machine. The first memory may be a private memory that is encrypted with a VM-specific key associated with the virtual machine. The destination hypervisor does not have access to the VM-specific key in some embodiments.

Upon completion of the guest initialization, the virtual machine may notify the source hypervisor of the completion of the guest initialization. For example, the virtual machine can execute a virtual machine exit. The execution of the virtual machine exit may cause a transition of control from the virtual machine to the hypervisor (e.g., the virtual machine stops running in the virtualized mode). The source hypervisor can then initiate the migration of the virtual machine from the source hypervisor to the destination hypervisor (e.g., by stopping the virtual machine on the source host machine). The source hypervisor can transmit, to the destination hypervisor, guest data that can be used to run the virtual machine on the destination host machine. The guest data may include an execution state of the virtual machine. In some embodiments, the execution state of the virtual machine may include at least a portion of the encrypted memory that stores the secret data (e.g., one or more encrypted memory pages (e.g., one or more memory pages of the first memory) storing the secret data).

Upon receiving the guest data, the destination host can store the guest data in a memory of the destination host machine to be associated with the virtual machine (also referred to as the "second memory"). The second memory may be encrypted with a memory encryption key that is not accessible to the destination hypervisor. The destination host can also resume the virtual machine on the destination host machine. As the secret data is transmitted to the destination hypervisor as part of the guest data, the secret data can be used to boot and/or run the virtual machine on the destination host machine. For example, the virtual machine can access data for running a guest operating system, an application, a service, etc. of the virtual machine using the secret data.

Implementations of the disclosure provide a technical improvement over the conventional systems by providing a key management mechanism that enables secure transmission of secret data for launching encrypted VMs. Compared to the conventional system, migrating and/or launching encrypted VMs utilizing the key management mechanism disclosed herein does not require communication between the encrypted VMs and the guest owner for transmission of the secret data. As a result, key exchange between the guest owner and the encrypted VMs may be avoided, resulting in more efficient migration and management of encrypted VMs and enhanced security for encrypted VMs running in public clouds.

Figure 1:
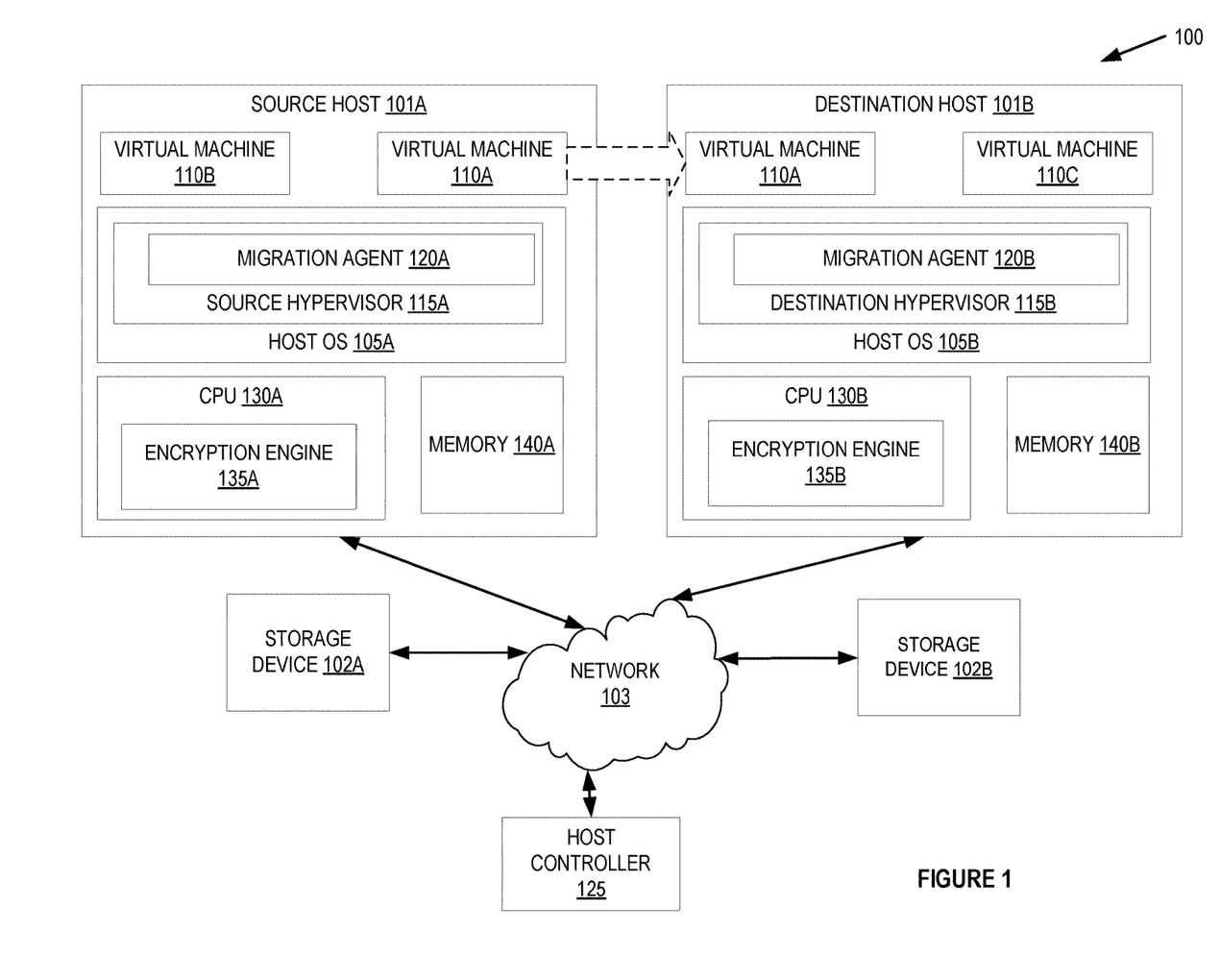
FIG. 1 depicts a schematic diagram illustrating an example computing system in accordance with one or more aspects of the disclosure.

FIG. 1 illustrates a virtualization system 100 in which embodiments of the present disclosure may operate. It should be noted that other architectures for virtualization system 100 (also referred to herein as system 100) are possible, and that the implementation of a virtualization system utilizing embodiments of the disclosure are not necessarily limited to the specific architecture depicted by FIG. 1.

The virtualization system 100 may include a source host machine 101a (the "source host 101a"), a destination host machine 101b (the "destination host 101b"), one or more storage devices 102 (e.g., 102a, 102b), and a host controller 125, which may all be communicably connected over a network 103. Each of host machines 101a and 101b may be computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to implement key management for encrypted virtual machines in accordance with the present disclosure.

The network 103 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In some implementations, host machines 101a and 101b may belong to a cluster comprising additional computer systems not depicted in FIG. 1, while in some other implementations, host machines 101a and 101b may be independent systems that are capable of communicating via network 103.

The source host 101a and the destination host 101b can include hardware components, such as one or more physical central processing units (CPUs) 130a-130b, memory 140a-140b, and other hardware components. One or more processors may be embodied as CPU 130a-130b, which can be and/or include a micro-processor, digital signal processor (DSP), or other processing component. CPU 130a-130b may process various received data and may carry out the code or instructions or one or more computer programs, for example, to provide input/output operations specified by the instructions.

Memory 140a-140b may include volatile memory devices (e.g., random access memory (RAM)), non-volatile memory devices (e.g., flash memory), and/or other types of memory devices), and a storage device (e.g., a magnetic hard disk, a Universal Serial Bus [USB] solid state drive, a Redundant Array of Independent Disks [RAID] system, a network attached storage [NAS] array, etc.). It should be noted that the fact that a single CPU 130a, 130b is depicted in FIG. 1 for each of host machines 101a and 101b is merely illustrative, and that in some other examples one or both of host machines 101a and 101b may comprise a plurality of CPUs. Similarly, in some other examples one or both of host machines 101a and 101b may comprise a plurality of storage devices, rather than a single storage device.

A source host 101a can host one or more VMs (e.g., VMs 110a, 110b) and can execute an operating system 105a ("host OS") to manage its resources. A destination host 101b can host one or more VMs (e.g., VM 110c) and can execute an operating system 105b ("host OS") to manage its resources. Each of VMs 110a, 110b, 110c can execute a guest OS (not shown). In one embodiment, the source host 101a executes a source hypervisor 115a to virtualize access to underlying source host hardware, making the use of a VM running on the source host 101a transparent to the guest OS running on the VM and users (e.g., a system administrator) of the source host 101a. The destination host 101b may execute the destination hypervisor 115b to virtualize access to underlying source host hardware, making the use of a VM running on the destination host 101b transparent to the guest OS running on the and users (e.g., a system administrator) of the destination host 101a.

In one implementation, source host 101a and destination host 101b may reside in different clouds, such as a first cloud and a second cloud, respectively. In some embodiments, the first cloud may be a private cloud. The second cloud may be a public cloud or a hybrid cloud. The public cloud may be a cloud service that is accessible to the public, such as Amazon's Elastic Compute Cloud™ (ECC), Microsoft's Azure™ service, or Google's Compute Engine™, or other similar cloud service. The private cloud may be similar to a public cloud but may be operated for a single organization and may be hosted and or managed by the organization or by a third-party. The hybrid cloud may be a cloud computing service that is composed of a combination of private, public and community cloud services, from different service providers. In another implementation, the source host 101a does not have to reside in a cloud and may be implemented by a computing device, such as a computing device described in connection with FIG. 8.

The CPU 130a, 130b may include an encryption engine 135a, 135 that provides an encrypted virtualization mechanism that encrypts one or more of VMs 110a, 110b, 110c to protect the VMs 110a, 110b, 110c from physical threats, as well as from other VMs 110a, 110b and the hypervisor 115a, 115b. In one implementation, the encryption engine 135a, 135b may be implemented as hardware circuitry of the CPU 130a, 130b. In some implementations, encryption engine 135a, 135b may be provided as firmware installed on the host machine 101a, 101b. The encryption engine 135a, 135b may implement a Secure Encrypted Virtualization (SEV) feature set provided by Advanced Micro Devices (AMD®). A VM protected by the encrypted virtualization mechanism is also referred to herein as an "encrypted virtual machine" or "encrypted VM."

When encrypted virtualization is enabled, the encryption engine 135a, 135b can tag all code and data with a VM identifier (ID) that indicates which VM that the data originated from or is intended for. This tag is kept with the data and prevents that data from being used by anyone other than the owner. Private memory of an encrypted VM may be encrypted with a VM-specific key. The VM-specific key is associated with the encrypted VM and is not accessible to a hypervisor managing the encrypted VM or any other virtual machine. The VM-specific key may be associated with a VM ID of the encrypted VM. In some embodiments, the VM-specific key may be generated and maintained by the encryption engine 135a, 135b. Accesses to the memory page may be encrypted and/or decrypted by encryption engine 214. As such, the encryption engine 135a, 135b may provide cryptographic isolation between VMs, as well as between the VMs and a hypervisor managing the VMs. In some embodiments, host 101a, 101b may host one or more encrypted VMs and/or one or more unencrypted VMs. For example, host 101a may host an encrypted VM 110a and one or more unencrypted VMs 110b. As another example, each of the virtual machines hosted by host 101a may be an encrypted VM. Each of host 101a, 101b may host any suitable number of encrypted VMs and/or unencrypted VMs. In some embodiments, hosts 101a and/or 101b may implement encrypted virtualization as described in connection with FIG. 2.

In one implementation, virtualization system 100 of FIG. 1 may perform a migration process to migrate a virtual machine from the source host 101a to the destination host 101b. For example, as illustrated in FIG. 1, VM 110a may be migrated from the source host 101a to the destination host 101b using at least one storage device 102 (storage devices 102a, 102b). The destination host 110b can include one or more VMs executing under the control of a corresponding destination hypervisor 115b. Storage device 102 can be accessible to the source host 101a and by the destination host 101b. The storage device 102 can be networked storage (e.g., network attached storage (NAS), storage area network (SAN). The storage device 102 can be located with the source host 101a, within the same network as the source host 101a, with the destination host 102b, within the same network as the destination host 102b, or with a third location, to name a few examples.

In one embodiment, the source hypervisor 115a may include a source migration agent 120a and the destination hypervisor 115b may include a corresponding destination migration agent 120b. The migration agent 120a, 120b can receive migration instructions from the host controller 125. The host controller 125 may reside on a designated computer system (e.g., a server computer, a desktop computer, etc.) or be part of the host machine 101a, 101b or another machine. Host controller 125 can manage VM migration by issuing instructions to hypervisor 115a, 115b. The host controller 125 can issue the migration instructions after a triggering event (e.g., a system administrator's migration request, system conditions, such as resource utilization by source host exceeding a threshold). The host controller 125 and migration agents 120 can work together to manage migrations, including determining a destination host machine 101b, coordinating one or more storage devices 102, scheduling migration, etc. Although shown as discrete components of the hypervisors 115a-115b, the migration agents 120a, 120b may be separate components coupled to hypervisors 115a-115b.

Virtualization system 100 can perform a migration process to migrate an encrypted VM, such as VM 110a, from source host 101a to destination host 101b (e.g., from source hypervisor 115a the destination hypervisor 115b). The guest initialization can include, for example, a firmware initialization for the firmware of VM 110a, a boot-loader software initialization, etc. In one implementation, the migration agent 110a can install a boot image to cause the VM 110a to load secret data to a private memory of the virtual machine. The secret data can use data that can be used to run an operating system, an application, a service, etc. of the VM 110a. The secret data may include, for example, a cryptographic key that can be used to access an encrypted disk (e.g., a virtual disk) associated with the VM 100a. The private memory may be a memory that is encrypted with a VM-specific key associated with the VM 100a. The VM-specific key may be generated by the encryption engine 135a. The destination hypervisor 115b does not have access to the VM-specific key in some embodiments.

Upon completion of the firmware virtualization, the VM 110a may send, to the migration agent 120a, a notification indicative of the completion of the firmware virtualization. For example, the VM 110a can execute a virtual machine exit and can inform the source hypervisor 115a of an exit reason indicative of the reason the VM 110a exits (e.g., the completion of the guest initialization). Upon receiving the notification, the source hypervisor 115a can initiate the migration of the virtual machine from the source host machine to the destination host machine (e.g., by stopping the VM 110a on the source host 101a). The migration agent 120a can transmit, to migration agent 120b, guest data that can be used to run the virtual machine. The guest data may include an execution state of the virtual machine. In some embodiments, the execution state of the virtual machine may include at least a portion of the encrypted memory that stores the secret data (e.g., one or more encrypted memory pages (e.g., one or more memory pages of the private memory) storing the secret data).

The guest data may be encrypted using a memory encryption key. In one implementation, the memory encryption key may be the VM-specific key (e.g., the encryption key used for encrypting the private memory). The encryption engine 135*a* can transmit the memory encryption key to the encryption engine 135*b* (e.g., via a secure communication connection) to enable the encryption engine 135*b* to decrypt the guest data. In another implementation, the memory encryption key may be generated by the encryption engine 135*b* (e.g., using a cryptographic context that is established with the destination host 101*b*). The encryption engine 135*b* can transmit the memory encryption key to the encryption engine 135*a* (e.g., via a secure communication connection). The encryption engine 135*a* can encrypt the data using the memory encryption key upon receiving the memory encryption key.

Upon receiving the guest data, the migration agent 120*b* can store the guest data in one or more portions of memory 140 to be associated with the virtual machine. The destination host can also resume the virtual machine on the destination host 101*b*. As the secret data is transmitted to the destination host 101*b* as part of the guest data, the secret data can be used to boot and/or run the virtual machine on the destination host machine. For example, the VM 110*a* can access data for running a guest operating system, an application, a service, etc. of the virtual machine using the cryptographic key (e.g., by accessing and/or decrypting the data stored in an encrypted disk using the cryptographic key).

As such, system 100 may provide a technical improvement over the conventional systems by providing a key management mechanism that enables secure transmission of secret data encrypted VMs for guest launch. Migrating and/or launching encrypted VMs utilizing the key management mechanism disclosed herein may avoid key exchange between a guest owner of the VM 110*a* and the VM110*a*. This may result in more efficient migration and management of encrypted VMs and enhanced security for encrypted VMs running in public clouds.

Figure 2:
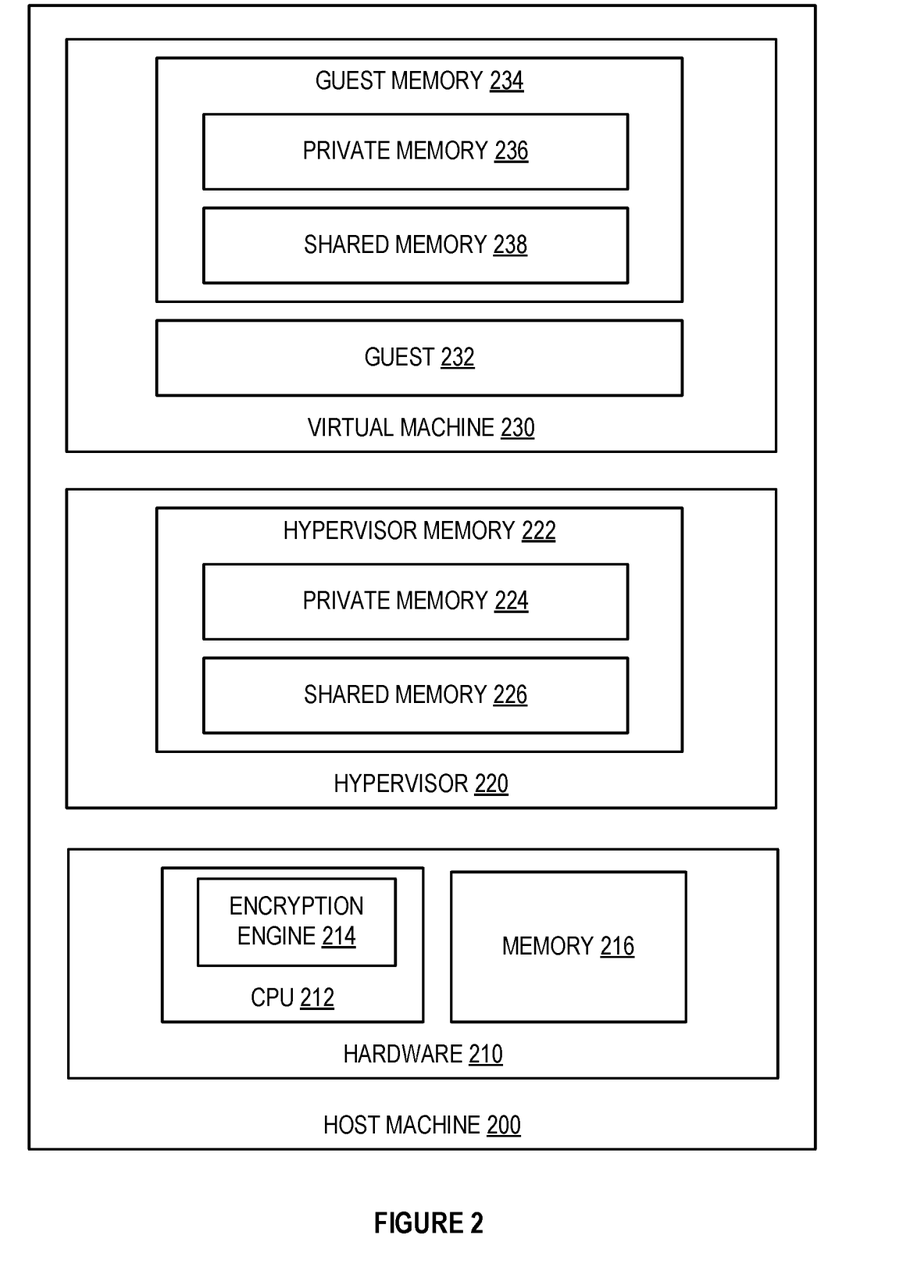
FIG. 2 schematically illustrates an example of a host machine according to some implementations of the disclosure.

FIG. 2 is a block diagram depicting a host machine 200 implementing encrypted virtualization in accordance with an implementation of the disclosure. In one implementation, host machine 200 is the same as host 101*a* and/or host 101*b* as described with respect to FIG. 1. As illustrated, host machine may include hardware 210, a hypervisor 220, a virtual machine 230, and/or any other suitable component. Hardware 210 may include CPU 212, memory 216, one or more I/O devices (not shown), etc. CPU 212 may further include an encryption engine 214. In one implementation, hypervisor 220 is the same as source hypervisor 105*a* and/or destination hypervisor 105*b* as described with respect to FIG. 1. Encryption engine 214 may be the same as encryption engine 135*a* and/or encryption engine 135*b* as described with respect to FIG. 1. Memory 216 may be the same as memory 140*a* and/or memory 140*b* as described with respect to FIG. 1. More or fewer components than illustrated as part of host machine 200 in FIG. 2 may be implemented in host machine 200, and implementations of the disclosure are not limited to those specifically described and illustrated herein.

Hypervisor 220 may abstract components of hardware 210 (e.g., CPU 212, memory 217, I/O devices, etc.), and present this abstraction to virtual 230 and one or more other virtual machines hosted by host machine 200 as virtual devices, such as virtual processors, virtual memory, virtual I/O devices, etc. Hypervisor 220 may include hypervisor memory 222. In some embodiments, hypervisor memory 222 may include private memory 224 and shared memory 226. Private memory 224 may be encrypted with an encryption key that is accessible to hypervisor 220 but inaccessible to virtual machine 230 or other virtual machine running on host machine 200 (also referred to as the "hypervisor key"). Shared memory 226 may be accessible to hypervisor 220, virtual machine 230, and/or other device that is granted access to shared memory 226. In some embodiments, shared memory 226 may be encrypted with an encryption key that is accessible to hypervisor 220 and virtual machine 230. Hypervisor 220 can use shared memory 226 to communicate with virtual machine 230 and/or one or more other virtual machines that have access to shared memory 226. For example, to transmit certain data to virtual machine 230, hypervisor 220 can store the data in shared memory 226. Guest 232 can then retrieve the data from shared memory 226.

Virtual machine 230 can execute a guest operating system (also referred to as "guest") 232 which may utilize the underlying virtual devices, including virtual processors, virtual memory (e.g., guest memory 234), and virtual I/O devices. One or more applications and/or services may be running on virtual machine 230 under the guest operating system.

Hypervisor 220 may map a virtual resource or state (e.g., registers, memory, files, etc.) to physical resources of host machine 200. For example, hypervisor 220 can present a guest memory 234 to guest 232. Hypervisor 220 may map the memory location of guest memory 234 to physical memory locations of memory 216. Guest memory 234 may store state information of guest 232 that may be mapped to physical memory locations of memory 216.

In some embodiments, virtual machine 230 may be an encrypted virtual machine as described in connection with FIG. 1. Guest memory 234 may include private memory 236 that is encrypted with an encryption key associated with the virtual machine (also referred to as the "VM-specific key"). The VM-specific key may be generated and/or managed by encryption engine 214. The VM-specific key is not accessible to hypervisor 220, other virtual machine running on host machine 200, or any other device. The VM-specific key may be generated and/or managed by encryption engine 214. For example, contents of private memory 236 may be encrypted and/or decrypted by encryption engine 214 using the VM-specific key. In some embodiments, encryption engine 214 may identify a particular memory page as a page of private memory 238 (e.g., by determining that a bit of an address of the memory page (e.g., a physical address) indicates that encrypted virtualization is enabled for the memory page). Accesses to the memory page (e.g., writing to or reading from the memory page) may then be encrypted and decrypted by encryption engine 214 using the VM-specific key.

Guest memory 234 may also include shared memory 238. Shared memory 238 may be accessible to hypervisor 220 and/or one or more other devices that have been granted access to shared memory 238. For example, shared memory 238 may be encrypted with an encryption key that is accessible to hypervisor 220 and virtual machine 230. The virtual machine 230 can use shared memory 238 to communicate with hypervisor 220 and/or one or more other virtual machines that have access to shared memory 238. For example, to transmit certain data to hypervisor 220, guest 232 can store the data in shared memory 238. Hypervisor 220 can then retrieve the data from shared memory 238.

In some embodiments, guest 232 can designate one or more particular portions of the guest memory 210 as being protected as private memory. For example, guest 232 can select one or more pages of guest memory 234 to be encrypted with the VM-specific key. Guest 232 can also select one or more pages of guest memory 234 as being shared memory 238. In some embodiments, host machine 200 may require certain types of memory (e.g., instruction pages, page tables, etc.) to be private to protect virtual machine 230.

Figure 3:
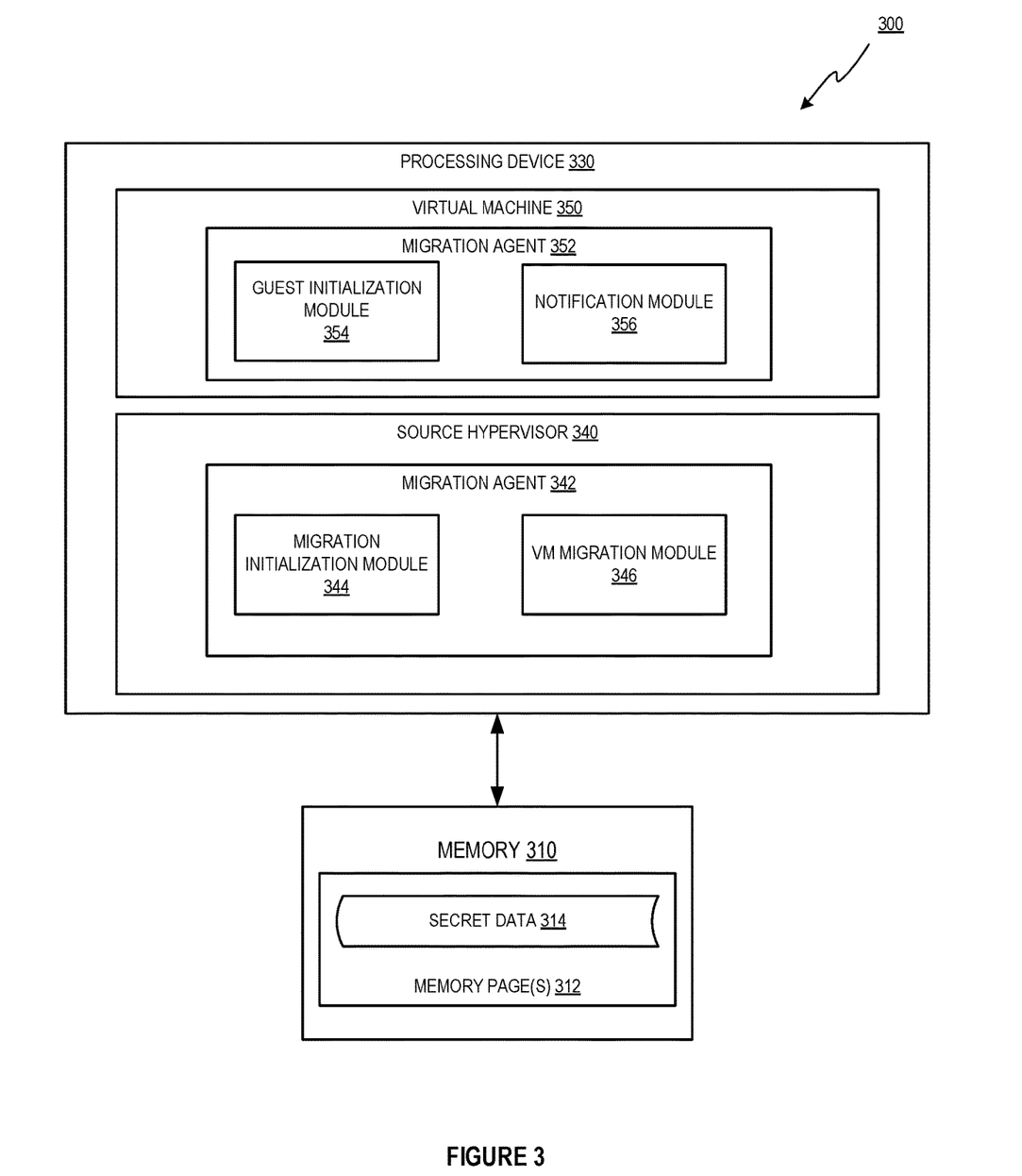
FIG. 3 is a block diagram illustrating an example of a source host machine in accordance with one or more aspects of the disclosure.

FIG. 3 illustrates an example source host machine 300 in which implementations of the disclosure may operate. Source host machine 300 may be the same as or similar to the source host machine 101a within virtualization system 100 described with respect to FIG. 1. Source host machine 300 may include components and modules for key management for encrypted VMs. The source host machine 300 may include a memory 310 that can store VM memory pages 320. In one implementation, the VM memory pages 320 may be memory (e.g., a page cache) of the source host machine 300 virtualized for use by encrypted VM 350. One or more memory pages 312 may be an encrypted memory page, such as a page of a private memory 236 as described in connection with FIG. 2.

The source host machine 300 may include a processing device 330 with a hypervisor 340. The hypervisor 340 may include a migration agent 342. The hypervisor 340 may perform VM migration via migration agent 342 to migrate a VM 350 from the hypervisor 340 to a destination hypervisor. The VM 350 may be an encrypted VM in some embodiments. The migration agent 342 may include a migration initialization module 344 and a VM migration module 346. The encrypted VM 350 may include a migration agent 352 that may further include a guest initialization module 354 and a notification module 356.

The migration initialization module 344 may receive a request to migrate the encrypted VM 350 to a destination host machine 360. The request may be issued by a host controller (e.g., the host controller 125) in some embodiments. The request may be issued, for example, in response to detecting a triggering event (e.g., a system administrator's migration request, system conditions, such as resource utilization by source host exceeding a threshold) by the host controller or any other suitable device.

The migration initialization module 344 may also determine whether a guest initialization is complete for the migration of the VM 350 to the destination host. The guest initialization may include placing the VM 350 in a predefined state suitable for the migration of the VM 350. For example, the predefined state may be and/or include that secret data (e.g., one or more cryptographic keys, digital signatures, etc.) associated with the VM 350 are stored in an encrypted memory of the VM 350 (e.g., a private memory 236 as described in connection with FIG. 2). In one implementation, the migration initialization module 344 can initiate the guest initialization by providing, to the VM 350, one or more instructions that cause the VM 350 to perform the guest initialization when executed by the VM 350. The instructions may include, for example, one or more instructions that cause the VM 350 to load the secret data (e.g., secret data 314) to an encrypted memory associated with the VM 350 (e.g., memory 310). In another implementation, the migration initialization module 344 can initiate the guest initialization by installing a boot image defining the guest initialization process. The boot image may include the secret data in some embodiments. In another embodiment, the boot image may include instruction that cause the VM 350 to request the secret data and load the secret data to the private memory.

The guest initialization module 354 can perform the guest initialization for the VM 350 to place the VM 350 in the predefined state. For example, the guest initialization module 354 may load the secret data associated with the VM 350 to an encrypted memory page of the VM 350 (e.g., a memory page of a private memory 236 as described in connection with FIG. 2). The secret data may include data that may be used to start a guest OS and/or to host one or more applications and/or services on the VM 350. The secret data may include, for example, one or more cryptographic keys that may be used to decrypt and/or access certain data associated with the VM 350 (e.g., data stored in a virtual disk associated with the VM 350). The encrypted memory page is not accessible to the destination hypervisor in some embodiments. In one implementation, the guest initialization module 354 can retrieve the secret data from a shared memory (e.g., a memory that is accessible to both source hypervisor 340 and the VM 350) and can then store the secret data in the private memory. The guest initialization module 354 can also load the secret data from the boot image in some embodiments in which the boot image includes the secret data.

Upon completion of the guest initialization by the guest initialization module 354, the notification module 356 can send, to the source hypervisor 340, a notification that the guest initialization is complete for the migration of the VM 350 to the destination hypervisor. For example, the notification module 356 can execute a virtual machine exist. The notification module 356 can also notify the source hypervisor 340 of an exit reason indicative of the reason that the VM 350 exited (e.g., completion of the guest initialization, loading of the secret data to the encrypted memory, etc.). In one implementation, the exit reason may be stored in a memory accessible to the hypervisor (e.g., a shared memory). In another implementation, the notification module 356 can send a message indicating the exit reason to the source hypervisor. In some embodiments, the notification module 356 can send the notification and/or to execute the virtual machine exit by executing a hypercall, sending an interrupt, and/or in any other suitable manner.

The migration initialization module 344 may receive the notification generated by the notification module 356. The migration initialization module 344 may further determine that the guest initialization is complete for the migration of the VM 350 to the destination hypervisor in view of the notification. The migration initialization module 344 can notify the VM migration module 346 of such determination in some embodiments.

The VM migration module 346 can initiate the migration of the VM 350 upon the completion of the firmware initiation. For example, the VM migration module 346 can initiate the migration of the virtual machine by stopping the virtual machine on the source host machine. As another example, the VM migration module 346 can store state information of the VM 350 (e.g., by storing a snapshot of the state of one or more registers associated with the VM 350).

The VM migration module 346 can then perform one or more operations to migrate the VM 350 to the destination host machine. The operations may include, for example, one or more copying operations for the VM 350. For example, the VM migration module 346 can copy an execution state of the VM 350 and can transmit the execution state to the destination hypervisor. The virtual machine execution state may include a memory state, a virtual processor state, a virtual devices state, a connectivity state, etc. of the VM 350. The execution state of the VM 350 may include one or more memory pages in some embodiments. For example, the execution state of the VM 350 may include at least a portion of the encrypted memory that stores the secret data.

Figure 4:
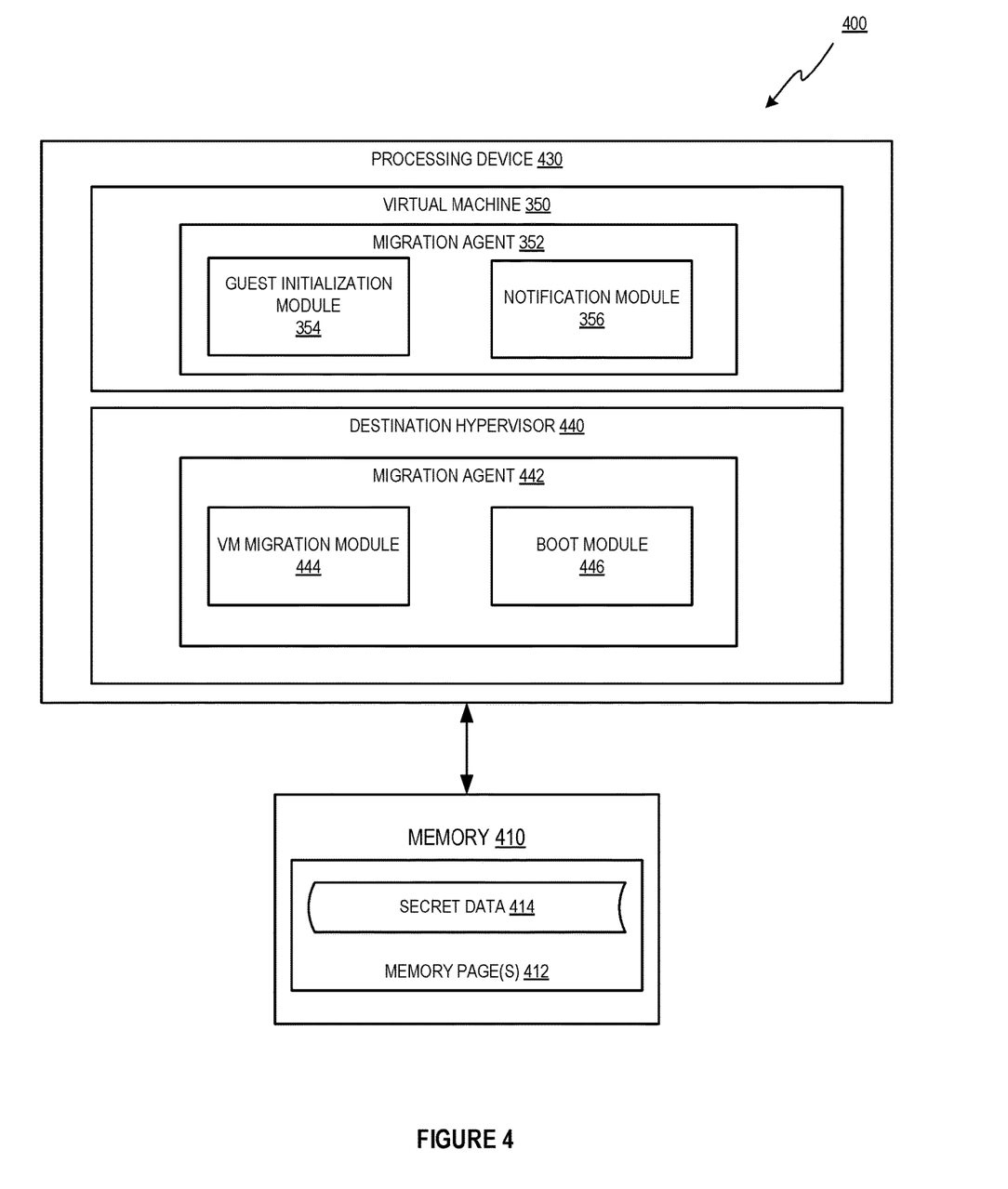
FIG. 4 is a block diagram illustrating an example of a destination host machine in accordance with one or more aspects of the disclosure.

FIG. 4 illustrates an example destination host machine 400 in which implementations of the disclosure may operate. Destination host machine 400 may be the same as or similar to the destination host machine 101b within virtualization system 100 described with respect to FIG. 1. Destination host machine 400 may include components and modules for key management for encrypted VMs. The destination host machine 400 may include a memory 410 that can store VM memory pages 420. In one implementation, the VM memory pages 420 may be memory (e.g., a page cache) of the destination host machine 400 virtualized for use by the encrypted VM 350. One or more memory pages 412 may include an encrypted memory page, such as a page of a private memory 236 as described in connection with FIG. 2.

The destination host machine 400 may include a processing device 430 with a hypervisor 440. The hypervisor 440 may include a migration agent 442. The hypervisor 440 may perform VM migration via migration agent 442. The migration agent 442 may include a VM migration module 444 and a boot module 446.

The VM migration module 444 can perform one or more operations to migrate a VM (e.g., the VM 350 of FIG. 3) to the hypervisor 440. The operations may include, for example, one or more copying operations for the VM 350. For example, the VM migration module 346 can receive, from a source hypervisor of the source host machine, an execution state of the VM 350 and can store the execution state in a memory to be associated with the virtual machine 350 (e.g., memory 410). The virtual machine execution state may include a memory state, a virtual processor state, a virtual devices state, a connectivity state, etc. of the VM. The execution state of the VM may include one or more memory pages in some embodiments. For example, the execution state of the VM may include at least a portion of the encrypted memory that stores the secret data (e.g., an encrypted memory page that stores secret data 414 (e.g., one or more cryptographic keys) of the VM 350).

The boot module 446 can resume the virtual machine on the destination host machine 400 (e.g., upon completion of the migration of the VM 350 or detection of any other suitable event). For example, the boot module 446 can initiate a boot process executing the VM 350. In one implementation, the boot module 446 can initiate the boot process by providing, to the VM 350, bootstrap instructions that cause VM 350 to perform the boot process when executed within the VM 350. In another implementation, the boot module 446 can initiate the boot process by installing a boot image defining an operating system, utilities and diagnostics, boot and data recovery information, etc. of the VM 350.

During the boot process, the VM 350 may start a guest OS (e.g., a guest 232 as described in connection with FIG. 2). In some embodiments, the guest initialization module 354 can obtain secret data that is required to start the guest OS and/or to host one or more applications and/or services on the VM 350. As described above, the secret data may be transmitted to and received by the VM migration module 444 as part of the execution state of the VM 350. The guest initialization module 354 can obtain the secret data by retrieving the secret data from the memory associated with the VM 350 (e.g., memory page(s) 412). The guest initialization module 354 can then use the secret data to complete the boot process. For example, the guest initialization module 354 can access data stored in an encrypted disk associated with the VM 350 using the secret data (e.g., by decrypting the data using the cryptographic keys or any other secret data), such as instructions defining the guest OS. The guest initialization module 354 can execute the guest OS using the data. In some embodiments, the notification module 356 may send, to migration agent 442 (e.g., the boot module 446), a notification indicative of the completion of the boot process.

Figure 5:
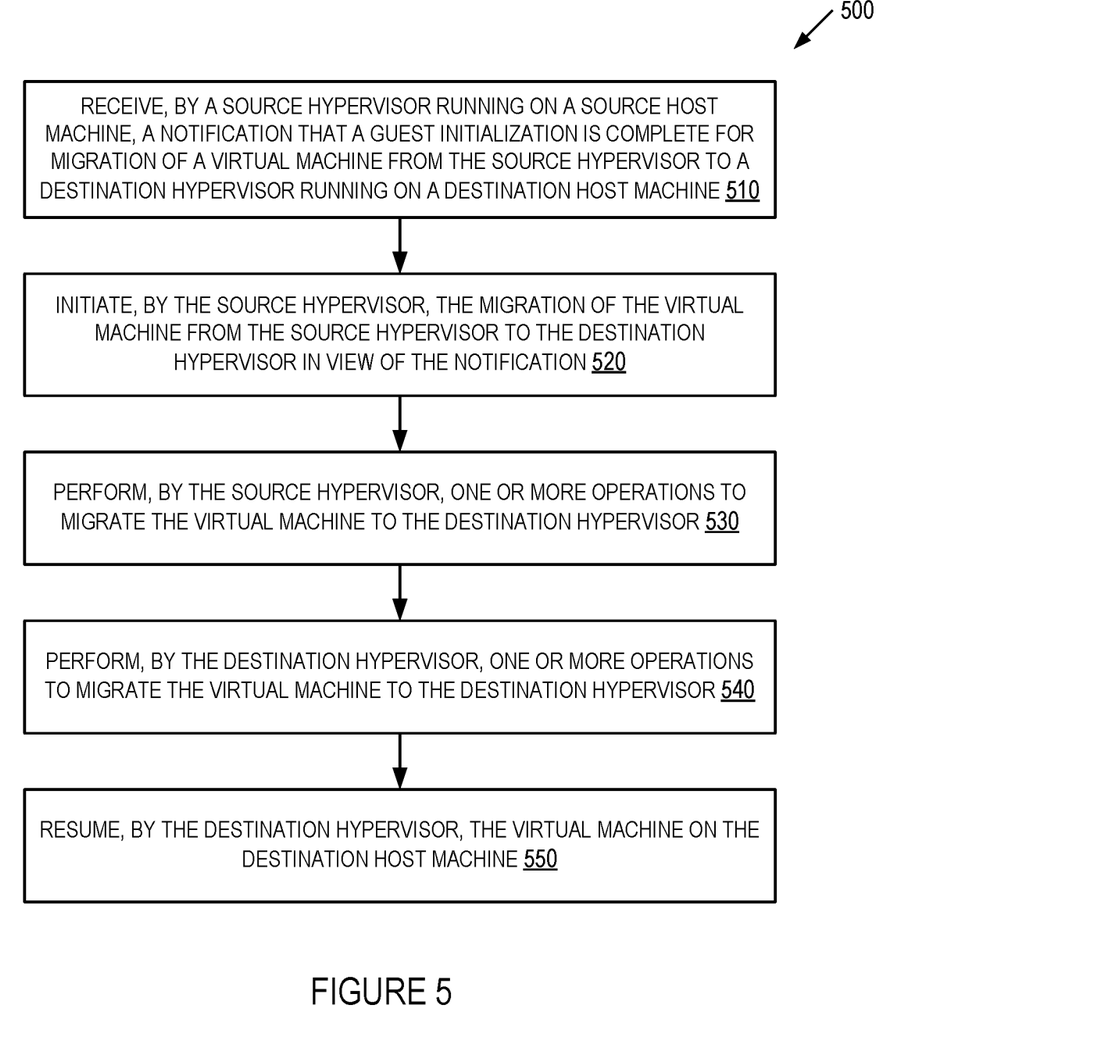
FIG. 5 depicts a flow diagram of a method of virtual machine migration in accordance with one or more aspects of the disclosure.
Figure 6:
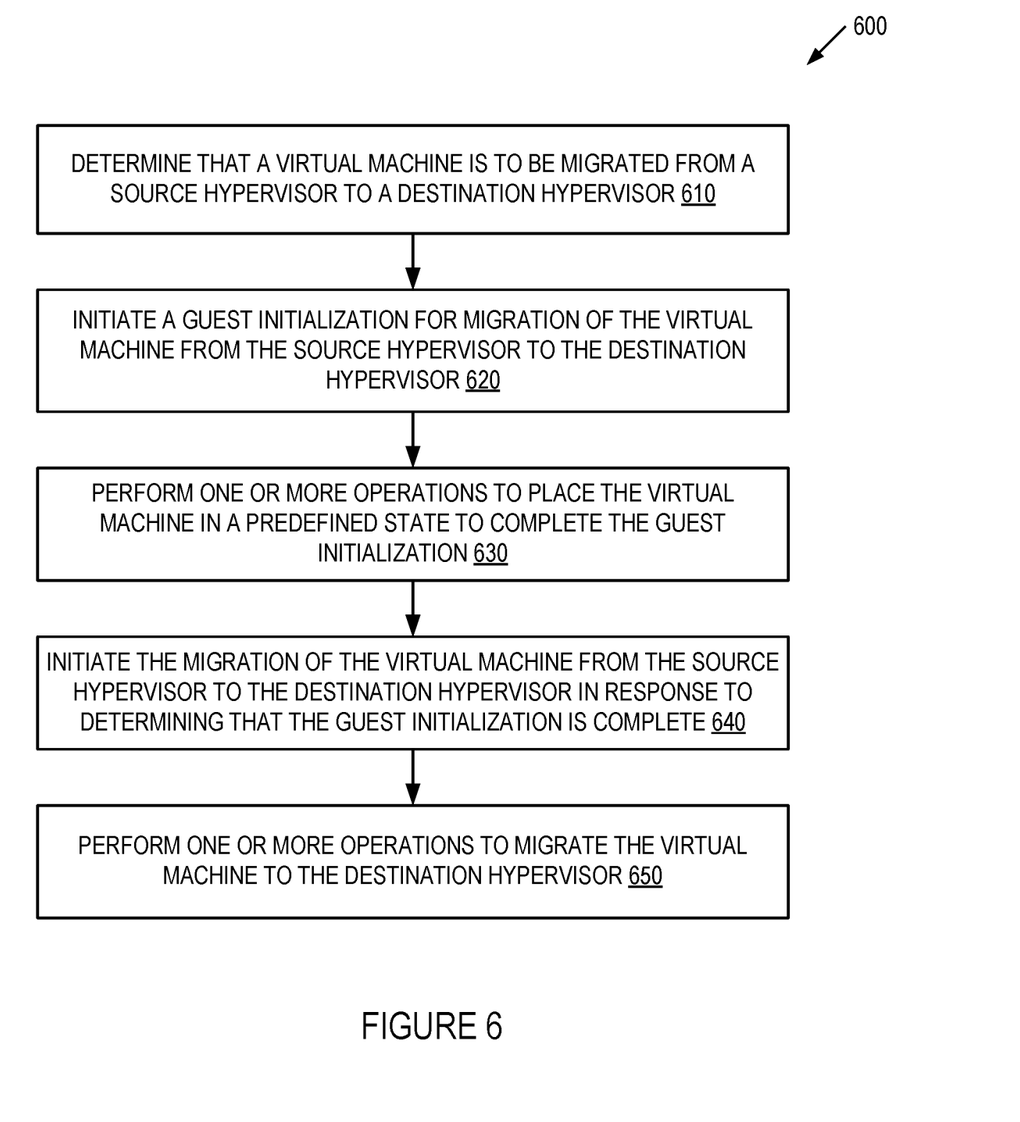
FIG. 6 depicts a flow diagram of a method of key management for encrypted virtual machines by a source host machine in accordance with one or more aspects of the disclosure.
Figure 7:
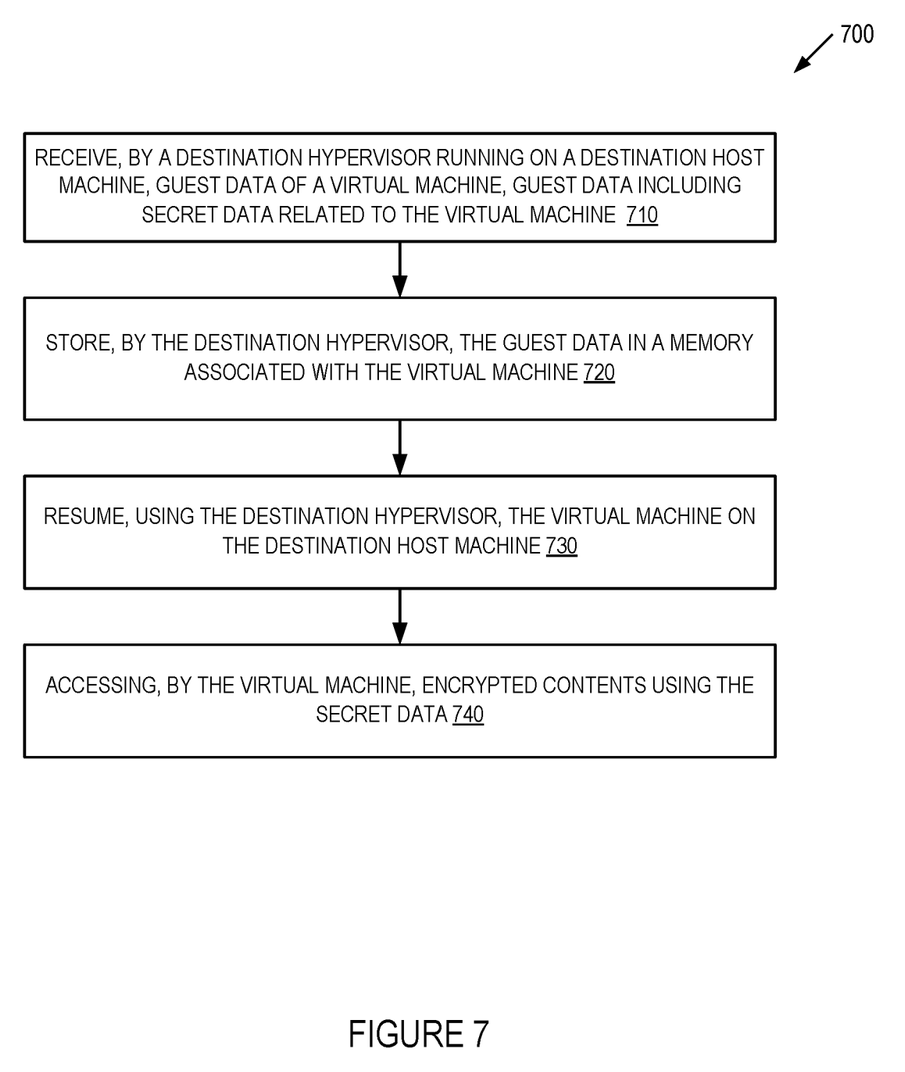
FIG. 7 depicts a flow diagram of a method of key management for encrypted virtual machines by a destination host machine in accordance with one or more aspects of the disclosure.

FIGS. 5, 6, and 7 depict flow diagrams for illustrative examples of methods 500, 600, and 700 for key management for encrypted VMs. Method 500 includes a method for migrating an encrypted virtual machine. Method 600 includes a method of key management for an encrypted virtual machine by a source host machine. Method 700 includes a method of key management for an encrypted virtual machine by a destination host machine. Methods 500, 600, and 700 may be performed by processing devices that may comprise hardware (e.g., circuitry, dedicated logic), computer readable instructions (e.g., run on a general purpose computer system or a dedicated machine), or a combination of both. Methods 500, 600, and 700 and each of their individual functions, routines, subroutines, or operations may be performed by one or more processors of the computer device executing the method. In certain implementations, methods 500, 600, and 700 may each be performed by a single processing thread. Alternatively, methods 500, 600, and 700 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In some embodiments, methods 500, 600, and 700 may be performed by a kernel of a hypervisor as shown in FIG. 1 or by an executable code of a host machine (e.g., a host operating system or firmware), an executable code of a virtual machine (e.g., a guest operating system or virtual firmware), or any other executable code, or a combination thereof.

Referring to FIG. 5, method 500 may begin at block 510, where a source hypervisor running on a source host machine receives a notification that a guest initialization is complete for migration of a virtual machine from the source hypervisor to a destination hypervisor running on a destination host machine. The notification may be provided by the virtual machine. The virtual machine may be hosted by the source host machine. In some embodiments, the destination host machine may reside in a public cloud.

The guest initialization may include placing the virtual machine in a predefined state that is suitable for migration from the source hypervisor to the destination hypervisor. For example, the guest initialization may include loading secret data associated with the virtual machine to a private memory of the virtual machine. Contents of the private memory may be encrypted using a memory encryption key that is not accessible to the destination hypervisor. In some embodiments, the memory encryption key may be generated and/or managed by a hardware component of the source host machine (e.g., an encryption engine as described in connection with FIGS. 1 and 2).

In some embodiments, the notification may comprise a virtual machine exit. The source hypervisor can receive the notification by detecting a virtual machine exit (e.g., exit of a virtual machine mode and/or entry of a hypervisor mode) and/or by determining that an exit reason associated with the virtual machine exit indicate the completion of the guest initialization. In one implementation, the source hypervisor can retrieve the exit reason from a memory accessible to the hypervisor (e.g., a shared memory). In another implementation, the source hypervisor can receive, form the virtual machine, a message indicating the exit reason. In some embodiments, the source hypervisor can receive the notification and/or detect the virtual machine exit by receiving a hypercall, an interrupt, etc. from the virtual machine.

At block 520, the source hypervisor can initiate the migration of the virtual machine from the source hypervisor to the destination hypervisor in view of the notification (e.g., by determining that the notification indicates the completion of the guest initialization). For example, the source hypervisor can initiate the migration of the virtual machine by stopping the virtual machine on the source host machine. As another example, the source hypervisor can store state information of the virtual machine (e.g., by storing a snapshot of the state of one or more registers associated with the virtual machine).

At block 530, the source hypervisor can perform one or more operations to migrate the virtual machine to the destination hypervisor. For example, the source hypervisor can copy an execution state of the virtual machine and can transmit the execution state to the destination hypervisor. The execution state may include the contents of the encrypted memory and may include the secret data (e.g., a cryptographic key). In some embodiments, the execution state may include at least a portion of the encrypted memory that stores the secret data.

At block 540, the destination hypervisor may perform one or more operations to migrate the virtual machine to the destination host machine. For example, the destination hypervisor can receive, from the source hypervisor, the execution state of the virtual machine. As another example, the destination hypervisor can store the execution state of the virtual machine in a memory to be associated with the virtual machine (also referred to as the "second memory"). The second memory may be a private memory encrypted with a second memory encryption key that is not accessible to the destination hypervisor. The second memory encryption key may be generated by a hardware component of the destination host machine (e.g., an encryption engine of a CPU of the destination host machine).

At block 550, the destination hypervisor can resume the virtual machine on the destination host machine. For example, the destination hypervisor can initiate a boot process for the virtual machine. During the boot process, the virtual machine may start a guest OS. In some embodiments, the virtual machine may access the secret data (e.g., the cryptographic key) stored in the second encrypted memory and can use the secret data to boot the virtual machine or perform other functions. As an example, the virtual machine may access data stored in an encrypted disk using the cryptographic key.

Referring to FIG. 6, method 600 may be performed by a processing device of a source host machine as described herein. Method 600 may begin at block 610, where the processing device may determine that a virtual machine is to be migrated from a source hypervisor running on the source host machine to a destination hypervisor running on a destination host machine. In some embodiments, the destination host machine may reside in a public cloud or hybrid cloud.

At block 620, the processing device can initiate a guest initialization for migration of the virtual machine from the source hypervisor to the destination hypervisor. The guest initialization may include placing the virtual machine in a predefined state. The predefined state may be any state that is suitable for the migration of the virtual machine to the destination host machine. For example, the predetermined state may include that secret data associated with the virtual machine is stored in a private memory of the virtual machine. The secret data may include, for example, a cryptographic key that may be used to decrypt data related to the virtual machine, such as a disk decryption key, etc. In some embodiments, the cryptographic key is not accessible to the destination hypervisor.

At block 630, the processing device can perform one or more operations to put the virtual machine in the predefined state to complete the guest initialization. For example, the processing device can load the secret data to a private memory of the virtual machine. In one implementation, the processing device can install a boot image to load the secret data (e.g., the cryptographic key). In one implementation, the boot image includes the secret data. In another implementation, the secret data may be loaded from the source hypervisor. For example, the booting of the boot image may cause the virtual machine to retrieve the secret data from a shared memory and store the secret data in the private memory. The shared memory may be accessible to both the virtual machine and the source hypervisor.

At block 640, the processing device can initiate the migration of the virtual machine from the source hypervisor to the destination hypervisor in response to determining that the guest initialization is complete. For example, the processing device can stop the virtual machine on the source host machine. In some embodiments, the processing device can determine whether the guest initialization is complete by determining whether the virtual machine is in the predefined state. In some embodiments, the processing device can determine that the guest initialization is complete in view of a notification indicating that the guest initialization is complete. The notification may be provided by the virtual machine. For example, the virtual machine can execute a virtual machine exit. The virtual machine can also notify the source hypervisor of an exit reason indicating the reason that the virtual machine exited (e.g., the completion of the guest initialization). In one implementation, the exit reason may be stored in a memory accessible to the source hypervisor (e.g., a shared memory). In another implementation, the virtual machine can send a message indicating the exit reason to the source hypervisor. In some embodiments, the virtual machine can send the notification and/or to execute the virtual machine exit by executing a hypercall, sending an interrupt, and/or in any other suitable manner.

At block 660, the processing device can perform one or more operations to migrate the virtual machine to the destination hypervisor. For example, the processing device can copy guest data of the virtual machine and can transmit guest data to the destination hypervisor. The guest data may include an execution state of the virtual machine. The execution state may include the contents of the encrypted memory and may include the secret data (e.g., the cryptographic key).

Referring to FIG. 7, method 700 may be performed by a processing device of a destination host machine in accordance with some embodiments of the present disclosure. Method 700 may begin at block 710, where the processing device may receive, via a destination hypervisor running on the destination host machine, guest data of a virtual machine. For example, the guest data may include contents of a portion of an encrypted memory associated with the virtual machine (e.g., a portion of the encrypted memory that stores the secret data). The contents of the encrypted memory page may be encrypted by a memory encryption key associated with the virtual machine. In some embodiments, the destination hypervisor does not have access to the memory encryption key. In one implementation, the contents of the encrypted memory page include secret data associated with the virtual machine. The secret data may include a cryptographic key, such as a disk decryption key. The guest data may be transmitted from a source hypervisor running on a source host machine. In some embodiments, the destination host machine may reside in a public cloud or a hybrid cloud.

At block 720, the processing device can store the guest data in a memory associated with the virtual machine. The memory may be a private memory encrypted using a memory encryption key. The memory encryption key may be generated by a hardware component of the destination host machine (e.g., an encryption engine of a CPU of the destination host machine).

At block 730, the processing device can resume, via the destination hypervisor, the virtual machine on the destination host machine. For example, the processing device can initiate a boot process for the virtual machine (e.g., by installing a boot image). During the boot process, the virtual machine may start a guest OS. In some embodiments, the virtual machine may access the secret data (e.g., the cryptographic key) stored in the second encrypted memory and can use the secret data to boot the virtual machine or perform other functions. As an example, the virtual machine may access data stored in an encrypted disk using the cryptographic key.

At block 740, accessing, by the virtual machine, encrypted contents using the secret data. For example, the virtual machine can retrieve the cryptographic key and can access data stored in an encrypted virtual disk associated with the virtual machine using the cryptographic key.

Figure 8:
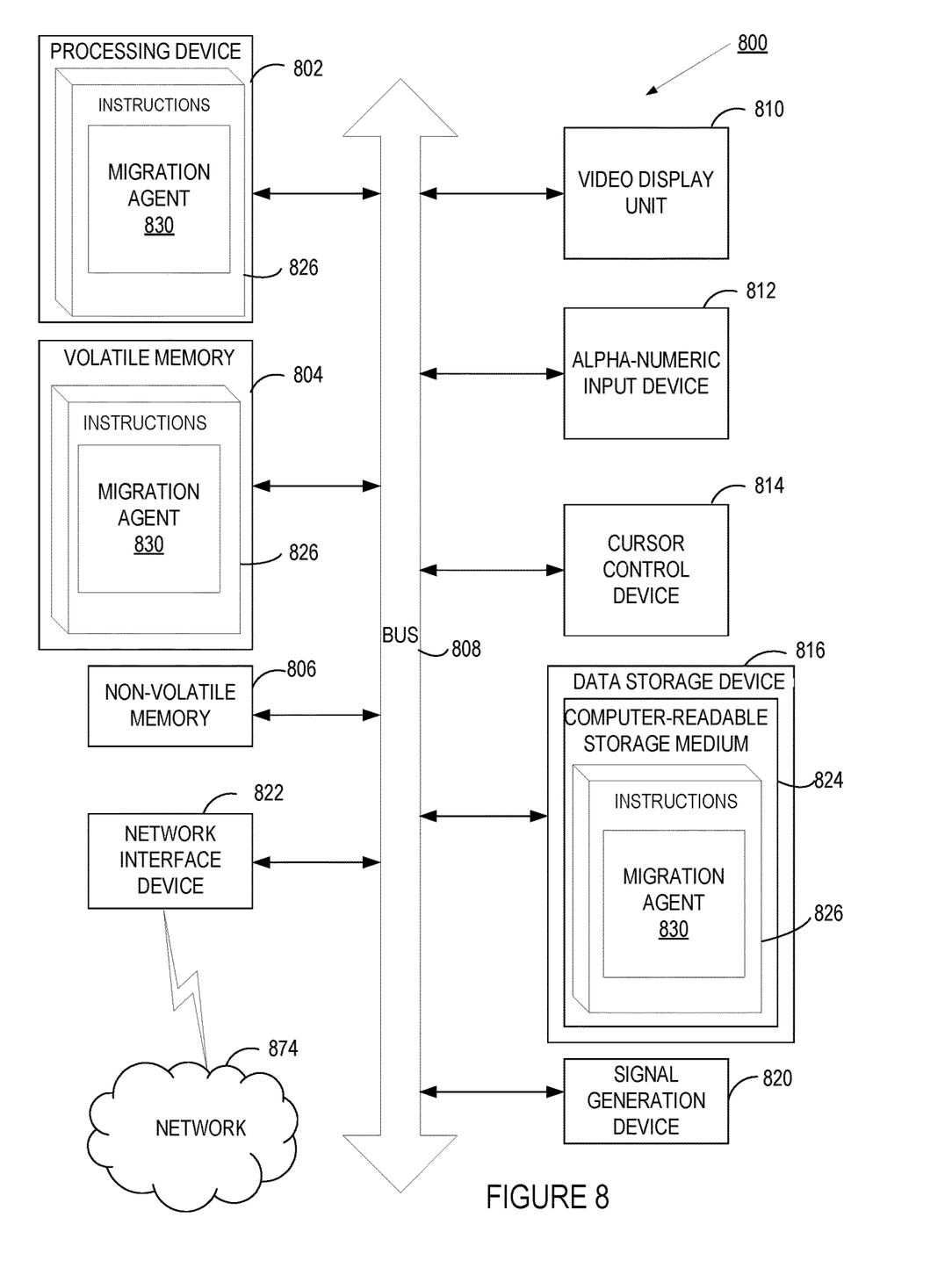
FIG. 8 depicts a block diagram of an illustrative computing device operating in accordance with the examples of the disclosure.

FIG. 8 depicts a block diagram of a computer system operating in accordance with one or more aspects of the disclosure. In various illustrative examples, computer system 800 may correspond to a computing device, such as computer system 100 of FIG. 1. The computer system may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., random access memory (RAM)), a non-volatile memory 806 (e.g., read-only memory (ROM) or electrically-erasable programmable ROM (EEPROM)), and a data storage device 816, which may communicate with each other via a bus 808.

Processing device 802 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 800 may further include a network interface device 822. Computer system 800 also may include a video display unit 810 (e.g., an LCD), an alphanumeric input device 812 (e.g., a keyboard), a cursor control device 814 (e.g., a mouse), and a signal generation device 820.

Data storage device 816 may include a non-transitory computer-readable storage medium 824 on which may store instructions 826 encoding any one or more of the methods or functions described herein, including instructions for a migration agent 830 (e.g., migration agent 120a, 102b, 352 of FIGS. 1, 3, and 4 for implementing methods 500, 600 and/or 700 of FIGS. 5, 6, and 7.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Example 1 is a method comprising: receiving, by a source hypervisor running on a source host machine, a notification that a guest initialization is complete for migration of a virtual machine from the source hypervisor to a destination hypervisor running on a destination host machine, wherein the guest initialization comprises storing secret data associated with the virtual machine in an encrypted memory; initiating, by the source hypervisor, the migration of the virtual machine from the source hypervisor to the destination hypervisor in view of the notification; and transmitting, by the source hypervisor, an execution state of the virtual machine to the destination hypervisor, the execution state comprising at least a portion of the encrypted memory storing the secret data.

Example 2 includes the subject matter of example 1, wherein the destination host machine is in a public cloud.

Example 3 includes the subject matter of example 1, wherein initiating the migration of the virtual machine from the source hypervisor to the destination hypervisor comprises stopping the virtual machine on the source host machine.

Example 4 includes the subject matter of example 1, wherein the notification comprises a virtual machine exit.

Example 5 includes the subject matter of example 1, wherein the guest initialization comprises at least one of a firmware initialization or a boot-loader software initialization.

Example 6 includes the subject matter of example 1, wherein the secret data comprises a cryptographic key, and wherein the guest initialization comprises loading the cryptographic key to a first memory associated with the virtual machine.

Example 7 includes the subject matter of example 6, wherein the first memory is encrypted with a memory encryption key that is generated by a hardware component of the source host machine.

Example 8 includes the subject matter of example 1, further comprising: receiving, by a destination hypervisor running on the destination host machine, the execution state of the virtual machine; and storing the execution state of the virtual machine in a second memory associated with the virtual machine.

Example 9 includes the subject matter of example 8, further comprising: resuming, by the destination hypervisor, the virtual machine on the destination host machine.

Example 10 includes the subject matter of example 9, wherein resuming, by the destination hypervisor, the virtual machine on the destination host machine comprises: initiating a boot process to execute the virtual machine on the destination host machine, wherein the boot process comprises executing a guest operating system of the virtual machine utilizing the secret data.

Example 11 is a method comprising: initiating, by a processing device, a guest initialization for migration of a virtual machine from a source hypervisor running on a source host machine to a destination hypervisor running on a destination host machine; determining, by the processing device, whether the guest initialization is complete for migration of the virtual machine from the source hypervisor to the destination hypervisor by determining whether the virtual machine is in a predefined state; and initiating the migration of the virtual machine from the source hypervisor to the destination hypervisor in response to determining that the guest initialization is complete.

Example 12 includes the subject matter of example 11, wherein initiating the migration of the virtual machine from the source hypervisor to the destination hypervisor comprises stopping the virtual machine on the source host machine.

Example 13 includes the subject matter of example 11, wherein the predefined state comprises that secret data associated with the virtual machine is stored in an encrypted memory associated with the virtual machine.

Example 14 includes the subject matter of example 13, wherein initiating the guest initialization comprises installing a boot image to cause the virtual machine to load the secret data to the encrypted memory.

Example 15 includes the subject matter of example 14, wherein the boot image comprises the secret data.

Example 16 includes the subject matter of example 13, wherein the guest initialization comprises loading, by the virtual machine, the secret data to the encrypted memory from the source hypervisor.

Example 17 includes the subject matter of example 16, further comprising: sending, by the virtual machine, a notification that the virtual machine is in the predefined state to the source hypervisor.

Example 18 includes the subject matter of example 17, wherein sending the notification comprises executing a virtual machine exit.

Example 19 includes the subject matter of example 17, further comprising: determining, by the source hypervisor, that the virtual machine is in the predefined state in response to receiving the notification.

Example 20 includes the subject matter of example 17, wherein the encrypted memory is encrypted with a memory encryption key inaccessible to the source hypervisor Example 21 includes the subject matter of example 20, wherein the memory encryption key is accessible to a hardware component of the source host machine.

Example 22 includes the subject matter of example 13, further comprising: transmitting an execution state of the virtual machine from the source host machine to the destination host machine, wherein the execution state of the virtual machine comprises at least a portion of the encrypted memory that stores the secret data.

Example 23 is a method comprising: receiving, by a destination hypervisor running on a destination host machine, an execution state of a virtual machine from a source hypervisor running on a source host machine, wherein the execution state of the virtual machine comprises an encrypted memory page storing secret data associated with the virtual machine; storing the execution state of the virtual machine in a memory associated with the virtual machine; and resuming, by the destination hypervisor, the virtual machine on the destination host machine.

Example 24 includes the subject matter of example 23, wherein the encrypted memory page is encrypted with a memory encryption key inaccessible to the destination hypervisor.

Example 25 includes the subject matter of example 23, wherein the memory encryption key is inaccessible to the virtual machine.

Example 26 includes the subject matter of example 23, wherein the memory encryption key is accessible to a hardware component of the destination host machine.

Example 27 includes the subject matter of example 23, further comprising: retrieving, by the virtual machine, the secret data from the memory associated with the virtual machine.

Example 28 includes the subject matter of example 27, wherein the secret data comprises a cryptographic key.

Example 29 includes the subject matter of example 28, further comprising: accessing, by the virtual machine, an encrypted virtual disk associated with the virtual machine using the cryptographic key.

Example 30 includes the subject matter of example 23, further comprising booting the virtual machine using the secret data.

Example 31 is an apparatus comprising: a processing device; and means for receiving, using a source hypervisor running on a source host machine, a notification that a guest initialization is complete for migration of a virtual machine from the source hypervisor to a destination hypervisor; means for initiating the migration of the virtual machine from the source hypervisor to the destination hypervisor in view of the notification; and means for transmitting, via the source hypervisor, an execution state of the virtual machine to the destination hypervisor, the execution state comprising an encrypted memory page storing secret data associated with the virtual machine.

Example 32 is the apparatus of example 31, further comprising the subject matter of any of examples 1-30.

Example 33 is a system comprising: a memory; and a processing device operatively coupled to the memory, the processing device to implement the subject matter of any of examples 1-31.

Example 34 is a non-transitory machine-readable storage medium including instructions that, when accessed by a processing device, cause the processing device to implement the subject matter of any of examples 1-31.

Unless specifically stated otherwise, terms such as "receiving," "invoking," "associating," "providing," "storing," "performing," "utilizing," "deleting," "initiating," "marking," "generating," "transmitting," "completing," "executing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 500, 600, and 700 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

What is claimed is:

1. A method comprising:
receiving, by a source hypervisor running on a source host machine, a notification of a virtual machine exit and a reason for the virtual machine exit, the reason for the virtual machine exit comprising an indication that secret data associated with the virtual machine has been stored in an encrypted memory of the source host machine, the secret data comprising data to be used to initiate a boot process to execute the virtual machine on a destination host machine;
determining, by the source hypervisor and in view of the received notification, that a guest initialization is complete for migration of the virtual machine from the source host machine to the destination host machine;
initiating, by the source hypervisor, the migration of the virtual machine from the source host machine to the destination host machine in view of the notification; and
transmitting, by the source hypervisor and to the destination host machine, one or more memory pages of the encrypted memory that store the secret data.

2. The method of claim 1, wherein the destination host machine is in a public cloud.

3. The method of claim 1, wherein initiating the migration of the virtual machine from the source host machine to the destination host machine comprises stopping the virtual machine on the source host machine.

4. The method of claim 1, wherein the guest initialization comprises at least one of a firmware initialization or a boot-loader software initialization.

5. The method of claim 1, wherein the guest initialization comprises loading the secret data to a first memory associated with the virtual machine, wherein the first memory is encrypted with a memory encryption key.

6. The method of claim 1, wherein the secret data comprises a cryptographic key.

7. The method of claim 1, further comprising:
receiving, by a destination hypervisor running on the destination host machine, the one or more memory pages of the encrypted memory; and
storing the one or more memory pages of the encrypted memory in a second memory associated with the virtual machine.

8. The method of claim 7, further comprising:
resuming, by the destination hypervisor, the virtual machine on the destination host machine.

9. The method of claim 8, wherein resuming, by the destination hypervisor, the virtual machine on the destination host machine comprises:
initiating the boot process to execute the virtual machine on the destination host machine, wherein the boot process comprises executing a guest operating system of the virtual machine utilizing the secret data.

10. A system comprising:
a memory of a source host machine; and a processing device operatively coupled to the memory, the processing device to:

receive, using a source hypervisor running on the source host machine, a notification of a virtual machine exit and a reason for the virtual machine exit, the reason for the virtual machine exit comprising an indication that secret data associated with the virtual machine has been stored in an encrypted portion of the memory, the secret data comprising data to be used to initiate a boot process to execute the virtual machine on a destination host machine;

determining, by the source hypervisor and in view of the received notification, that a guest initialization is complete for migration of the virtual machine from the source host machine to the destination host machine;

initiate, using the source hypervisor, the migration of the virtual machine from the source host machine to the destination host machine in view of the notification; and transmit, by the source hypervisor and to the destination host machine, one or more memory pages of the encrypted memory that store the secret data.

11. The system of claim 10, wherein, to initiate the migration of the virtual machine from the source host machine to the destination host machine, the processing device is further to stop the virtual machine on the source host machine.

12. The system of claim 10, wherein the guest initialization comprises at least one of a firmware initialization or a boot-loader software initialization.

13. The system of claim 10, wherein the guest initialization comprises loading the secret data to a first memory associated with the virtual machine, wherein the first memory is encrypted with a memory encryption key.

14. The system of claim 13, wherein the secret data comprises a cryptographic key.

15. The system of claim 10, wherein the processing device is further to:

receive, by a destination hypervisor running on the destination host machine, the one or more memory pages of the encrypted memory; and store the one or more memory pages of the encrypted memory in a second memory associated with the virtual machine.

16. The system of claim 15, wherein the processing device is further to:

resume, by the destination hypervisor, the virtual machine on the destination host machine.

17. The system of claim 16, wherein, to resume the virtual machine on the destination host machine, the processing device is further to:

initiate the boot process to execute the virtual machine on the destination host machine, wherein the boot process comprises executing a guest operating system of the virtual machine utilizing the secret data.

18. A non-transitory machine-readable storage medium including instructions that, when accessed by a processing device, cause the processing device to:

receive, using a source hypervisor running on a source host machine, a notification of a virtual machine exit and a reason for the virtual machine exit, the reason for the virtual machine exit comprising an indication that secret data associated with the virtual machine has been stored in an encrypted memory of the source host machine, the secret data comprising data to be used to initiate a boot process to execute the virtual machine on a destination host machine;

determine, by the source hypervisor and in view of the received notification, that a guest initialization is complete for migration of the virtual machine form the source host machine to the destination host machine;

initiate, using the source hypervisor, the migration of the virtual machine from the source host machine to the destination host machine in view of the notification; and transmit, by the source hypervisor and to the destination host machine, one or more memory pages of the encrypted memory that stores the secret data.

* * * * *